2,882,365

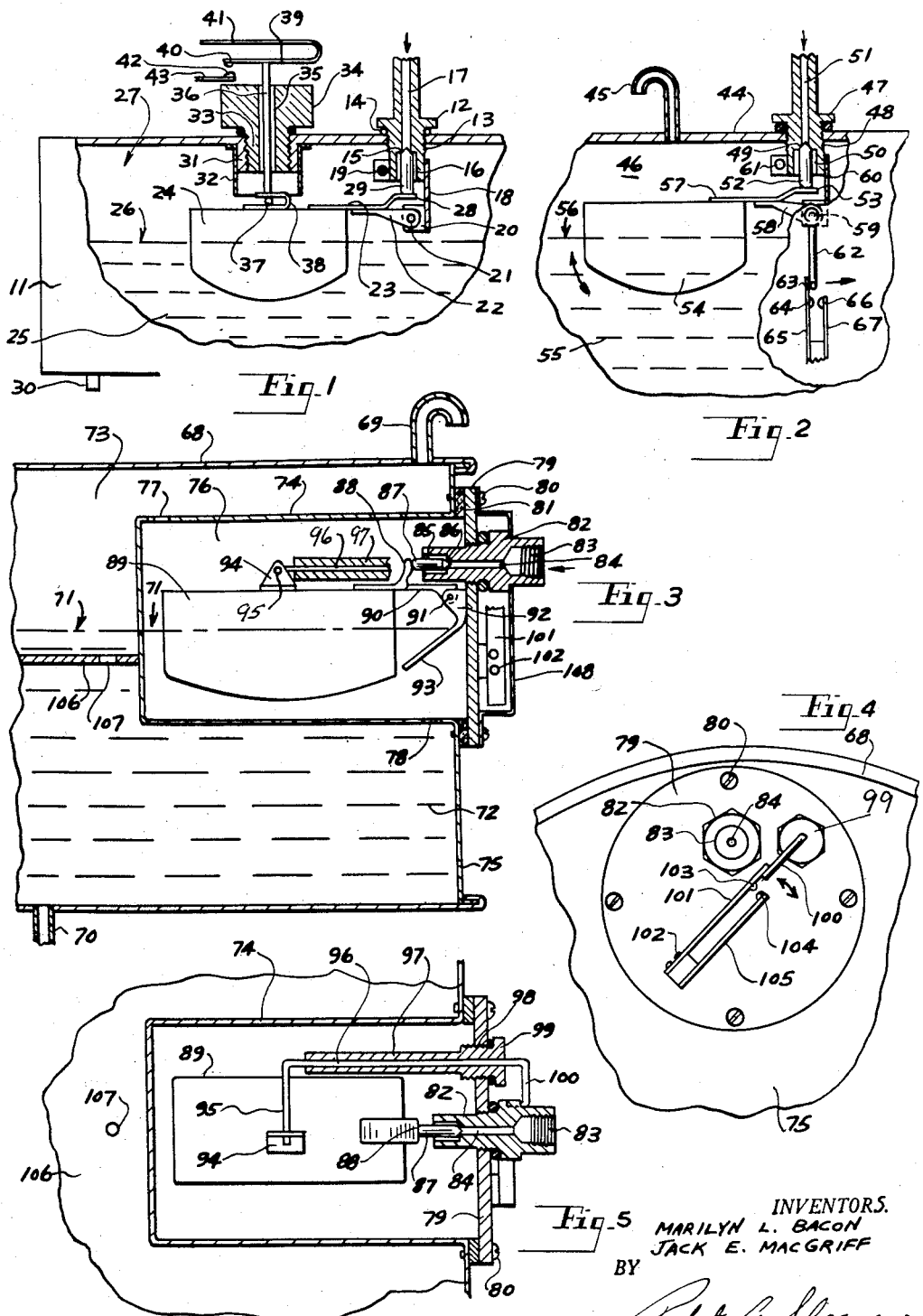

FLUID LEVEL INDICATOR

Jack E. MacGriff and Marilyn L. Bacon, Detroit, Mich.

Application November 17, 1955, Serial No. 547,423

4 Claims. (Cl. 200—84)

This invention relates to a liquid level indicator and is a continuation in part of our co-pending patent application, Serial Number 360,092, filed June 8, 1953, now Patent No. 2,777,030. More particularly, the present invention relates to a liquid level indicator which includes within a fluid storage container a vertically movable float which is adapted for maintaining a predetermined level of fluid within the container and is adapted to control the unseating of a needle valve to permit the flow of fluid into said container as it is withdrawn therefrom.

It is the further object of the present invention to provide in conjunction with said float control a switch mechanism which will respond to the falling of the predetermined fluid level such as where the supply of fluid is exhausted so that as the said fluid level falls, the switch will close for energizing an electrical circuit to activate a visible or audible signal, such as upon the dashboard of a vehicle, as set forth in our copending patent application, Serial Number 360,092, filed June 8, 1953.

It is the further object of the present invention to provide in conjunction with the flow control valve and float of said container, a movable rod which is joined at one end to the said float for corresponding movements therewith and with the other end of said rod projecting through the wall of the container for normally maintaining in spaced relation one of a pair of closable contacts.

These and other objects will be seen from the following specification and claims in conjunction with the appended drawing, in which:

Fig. 1 is a fragmentary elevational section of a portion of a fluid container embodying the fluid level control and signal indicator mechanism.

Fig. 2 is a fragmentary elevational section of a slightly different form of indicator mechanism.

Fig. 3 is a fragmentary elevational section of still another form of flow control and level indicator mechanism.

Fig. 4 is a fragmentary end view of the structure shown in Fig. 3; and

Fig. 5 is a fragmentary plan section of the structure shown in Fig. 3.

It will be understood that the above drawing illustrates merely several preferred embodiments of the invention, and that other embodiments are contemplated within the scope of the claims hereafter set forth.

Referring to Fig. 1, a container 11 is fragmentarily shown and which is normally vented as at 35 and which includes fluid inlet 12 such as might be connected to the fuel gas line from the tank or fuel pump of an internal combustion engine, as an automobile. There is also provided a fluid outlet 30 such as might be connected with the carburetor of such vehicle.

Inlet 12 includes the exteriorly threaded fitting 13 which threadedly projects through the top wall of container 11 and down into said container, there being a suitable gasket 14 interposed. Fitting 12 has an axial aperture 16 adjacent one end which terminates in the annular valve seat 15 with which registers the needle valve 29 in the manner hereafter described. Passage 16 terminates at its upper end adjacent said seat in the elongated inlet 17 which is of slightly reduced diameter and through which fuel, for illustration, is delivered for maintaining the fluid level 26 of the fluid 25 within the said container.

Bracket 18 is secured to an interior portion of container 11 as at 19 and has a lateral extension 20 at its lower end for supportably receiving transverse pin 21 which journals one end of arm 22. Said arm at its opposite end is joined to the horizontally disposed laterally directed arm 23 secured to the top surface of float 24, said arm 23 having a vertically displaced member 28 which supportably receives the lower end of needle valve 29, normally maintaining said valve seated as shown in Fig. 1 when the fluid level 26 is at a predetermined level to thereby control this level and the introduction of fuel into said container.

Chamber 27 above said fluid is vented to the outside through the elongated aperture 35 which extends throughout the length of the upright body 34 which is threaded down through the wall of said container as at 33 and through the hollow interiorly threaded boss 31 which depends from the top wall of said container. The annular splash shield 32 is mounted upon the exterior of boss 31 and projects therebelow, as shown in the drawing.

The upright switch control rod 36 is loosely projected through the aperture of body 34 and at its lower end is turned outwardly at right angles as at 37 to retainingly engage the reverse turned clip 38 secured upon the top of float 24.

A normally open switch is mounted upon container 11 and includes the pair of normally spaced contacts 40 and 42, contact 42 being connected in an electrical circuit by the lead 43. Contact 40 is mounted upon the end of a resilient leaf or other support 39 which terminates in the lead 41 which forms another part of this same electrical circuit, which electrical circuit will be closed for energizing a suitable signal when the two contacts 40 and 42 are brought together upon sufficient falling of the fluid level 26 within the container.

The operation of the electrical circuit is fully set forth in our copending patent application, Serial Number 360,-092, filed June 8, 1953.

The upper end of valve control rod 36 extends above body 34 and supportably engages the leaf 39 normally spacing contact 40 from contact 42.

In normal operation the container 11 is interposed in the fuel supply line to the vehicle carburetor. While the supply of fuel remains unexhausted in the tank of the vehicle, fuel will be pumped or delivered to container 11 through inlet 17 and will be withdrawn from outlet 30. Any slight falling of the fluid level 26 due to withdrawing from said container will cause merely a slight downward movement of float 24 such as will permit unseating of needle valve 29 to permit sufficient flow of fuel into container 11 to bring the fluid level back to level indicated at 26 in the drawing, i.e., a substantially constant fluid level is thus maintained within said container as long as supply of fuel lasts.

Should the supply of fuel be exhausted so that no further fuel is delivered through inlet 17, then in that case the level 26 will not be raised as the fluid is withdrawn with the result that it will continue to fall and the float 24 will correspondingly move downwardly sufficiently so as to permit the rod 36 to effect a corresponding downward movement and contacts 40 and 42 will close.

In normal operation the slight downward movement of the float 24 such as to open the needle valve 26 and permit the flow of fuel into container 11 will not be sufficient to permit contact 40 to move into engagement with contact 42. This results in the normal operation of the container such that the contacts stay open. Of course, as the supply becomes exhausted, the level 26 will gradually recede and permit such downward movement of float 24 as will permit the contacts 42 and 40 to close, to thereby energize an electrical circuit.

A slight variation of the present invention is shown in Fig. 2 wherein the container 44 fragmentarily shown is vented as at 45 to the interior chamber 46 of said container. The fuel inlet fitting 47 is threadedly projected as at 48 down through the wall of said container and has a central aperture 50 at its lower end which terminates in the valve seat 49, and against which needle valve 52 is normally seated. The fitting 47 has an inlet passage 51 in communication with passage 50, but of less diameter as shown in Fig. 2.

The lower end of needle valve 52 is supported upon the member 53 on support arm 57 which is secured to float 54 and which projects rearwardly thereof in a horizontal position. In the position of float 54, valve 52 is seated against seat 49 in fitting 47 shutting off further flow of fuel through passageway 51 to thereby maintain a constant predetermined fluid level as at 56 of the fluid 55 within said container.

Float support 58 is secured to arm 57 at one end and at its opposite end is secured to the rod 59 which provides the pivotal support for float 54 and which is rotatably journaled through the lower end of bracket 60 which is secured to said container as at 61.

The switch control rod 59 which rotates in unison with float 54 projects outwardly through the side wall of container 11 and at its lower end as at 63 operatively and retainingly engages the resilient support 65 carrying contact 64. The rod element 63 normally maintains contacts 64 in spaced relation with contact 66 which is connected to lead wire 67, both of said contacts being suitably supported upon the exterior side wall of container 44.

The leads 65 and 67 form a part of an electrical circuit by which a visible or audible signal will be energized when contact 64 under the control of rotary rod 62 is permitted to move into engagement with contact 66.

A slight variation of the present invention is illustrated in Figs. 3, 4 and 5, wherein there is provided a fluid container 68 vented as at 69 and having an outlet 70 adapted for connection to a vehicle carburetor, for illustration, and within which container the fuel 72 is maintained at a predetermined level as indicated at 71. The chamber 73 above said fuel is in communication with the outside atmosphere through vent 69. Fig. 3 contemplates a situation where container 68 is of such size as to permit an adequate storage of fuel to permit continued driving of a vehicle after the main supply has been exhausted and after an audible or visible signal has been given to the driver that the main supply of fuel in the vehicle has been exhausted.

As road movement of the vehicle may cause considerable variation in the fluid level 71, due to the sloshing of said fuel, there is provided a separate and independent float chamber 74 of substantially reduced size which is positioned within container 68, and which may be formed as a part thereof, as by inwardly forming the end wall 75 of said container. Of course, it is contemplated that float chamber 74 may be constructed separately. In any event, chamber 74 is vented as at 77 to the interior chamber 73 of container 68. Furthermore, there is provided at least one opening 78 in the bottom wall of chamber 74 in communication with the fuel 72 whereby the same fluid level 71 is maintained upon the interior of chamber 74.

Cover 79 with intermediate gasket 81 is secured over the open end of chamber 74 as by the spaced screws 80.

Inlet fitting 82 with threaded inlet aperture 83 terminating in longitudinal passage 84 is mounted upon cover 79 of container 74 and projects into chamber 76. Passage 84 terminates at its inner end in a slightly enlarged passage 85 thereby defining within said fitting valve seat 86 with which normally registers needle valve 87 within opening 85.

The stop means or arm 88 mounted upon float 89 adjacent its rear end operatively engages the outer end of valve 87 and in the position of said float corresponding to a predetermined fluid level 71, the fluid supply through fitting 82 is cut off from container 68. Should the fluid level fall below the point indicated in Fig. 3 there will be a corresponding vertical movement of float 89 and needle valve 87 will be released slightly to permit such replenishment of fluid or fuel to thereby maintain a substantially constant fluid level 71 as long as the main supply of fuel or fluid exists within a vehicle gasoline tank, for illustration. Float support arm 90 is secured to said float and extends rearwardly thereof and is pivotally mounted as at 91 to the bracket 92 upon the interior of cover 79. Bracket 92 terminates at its lower end in an angularly inward and downwardly projecting stop 93 to thereby limit the pivotal downward movement of float 89 so that needle valve 87 cannot be accidentally displaced from passage 85.

Bracket 94 is centrally secured upon float 89 and is adapted to receive the inner end 95 of the rotatable switch control rod 96, said end 95 being arranged substantially at right angles to the rod element 96. Said rod is rotatably journalled within the elongated bearing 97 which threadedly engages cover 79 as at 98 and has an enlarged head 99 upon the exterior of said cover. The opposite end portion 100 of rod 96 is also arranged substantially at right angles to the said rod and extends upon the exterior of cover 79 as indicated in Figs. 4 and 5.

The end 100 of said rod normally engages the free end of the resilient support 101 which is mounted at 102 upon the exterior of container 74 and which carries the movable contact 103.

In normal operation said contact is in spaced relation to contact 104 upon the support 105, with control rod 96—100 maintaining the said contact 103 in the position shown in Fig. 4.

In normal operation the demands of the vehicle carburetor, for example, will continue to draw off fluid 72 from container 68 and the slight falling of the float 89 due to this flow will permit such introduction of fuel into the container as to maintain a substantially constant level 71 therein as long as the fuel supply continues. Such downward movement of float 89 will be insufficient normally to permit rod 96 to rotate to the extent that contact 103 will be permitted to engage contact 104. However, should the supply from the tank or other source be used up, and there is no replenishment in container 68 as the fluid is withdrawn, then the downward movement of float 89 will be of a greater nature, causing a rotation of control rod 96 which is secured to said float as indicated by the arrow in Fig. 4; and this movement will permit contact 103 to engage contact 104 for closing an electrical circuit to a remote visible or audible signal within the vehicle, as above referred to, to apprise the driver that the main fuel supply is exhausted.

As shown in Figs. 3 and 5, a baffle plate 106 apertured at 107 is arranged across the interior of container 68 below the fluid level 71 for the purpose of minimizing sloshing and fluid movement due to the vehicle moving over an irregular surface.

Having described our invention, reference should now be had to the claims which follow for determining the scope thereof.

We claim:

1. A fuel level indicator for a vehicle comprising a container having a fuel outlet, adapted to normally maintain a predetermined fuel level therein, a vented and apertured float chamber suspended within said container and partially immersed in said fuel for maintaining a corresponding fuel level in said chamber, a vertically movable float pivotally mounted upon and within said chamber extending throughout substantially the area of said chamber, a fuel inlet fitting on said container projected into said float chamber and having a valve seat intermediate its ends, a needle valve normally seated in said fitting and projected into said chamber, stop means on said float normally engaging said valve for seating the same and partially releasable upon a falling of said fuel level permitting unseating of said valve to maintain a substantially constant fuel level as long as the fuel supply continues, a normally open switch mounted on the exterior of said container and including a pair of spaced closable contacts, and a switch control rod mounted upon said container with one end projected into said chamber and joined to said float and movable therewith, and with the outer end of said rod engaging one of said contacts at said predetermined fuel level for maintaining said contacts in spaced relation and adapted upon downward movement of said float at a reduced fuel level to permit closing said contacts, said contacts on closing being adapted to indicate an interruption in the supply of fuel to said container, and an amount of fuel available for vehicle operation approximately equal to the volume of said container.

2. The indicator of claim 1, slight falling of said fluid level insufficient to permit closing of said contacts being sufficient to permit unseating of said valve.

3. The indicator of claim 1, and an elongated bearing projecting into said chamber to one side of said float for rotatably journalling said rod.

4. The indicator of claim 1, and an elongated bearing projecting into said chamber to one side of said float for rotatably journalling said rod, the ends of said rod being bent at right angles with one end loosely joined to said float and with the other end retainingly engaging one of said contacts, vertical movement of said float providing a rotary movement of said ends.

References Cited in the file of this patent

UNITED STATES PATENTS

| | | |
|---|---|---|
| 1,392,652 | Muzzy | Oct. 4, 1921 |
| 1,771,979 | Goodridge | July 29, 1930 |
| 1,791,181 | White | Feb. 3, 1931 |
| 2,149,619 | Mojonnier | Mar. 7, 1939 |
| 2,467,189 | Cohen et al. | Apr. 12, 1949 |
| 2,613,293 | Marks | Oct. 7, 1952 |